Aug. 3, 1943.  M. MAESER  2,325,620
CUTTING BLOCK
Filed Nov. 21, 1941
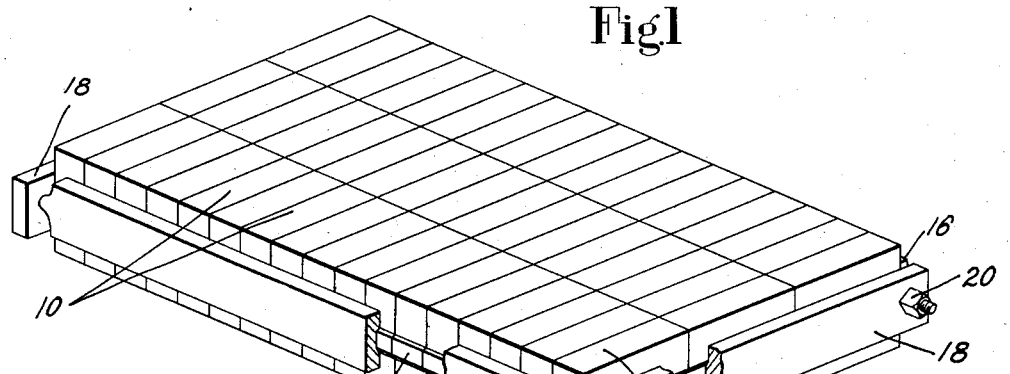
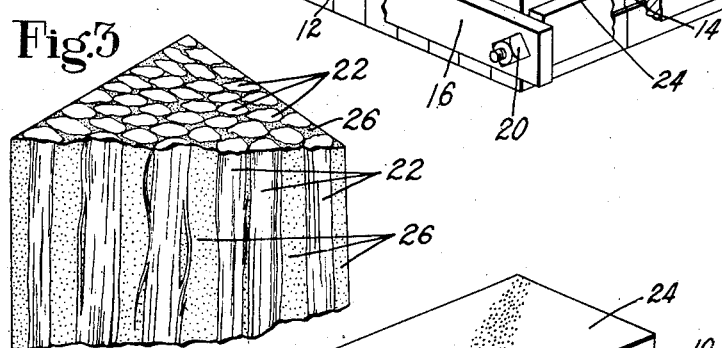
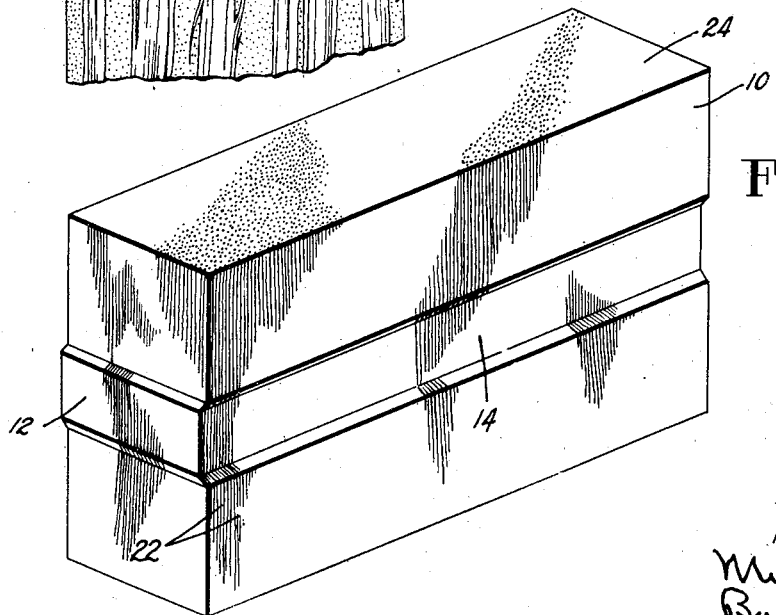

Patented Aug. 3, 1943

2,325,620

UNITED STATES PATENT OFFICE 2,325,620

CUTTING BLOCK

Mieth Maeser, Beverly, Mass., assignor to United Shoe Machinery Corporation, Flemington, N. J., a corporation of New Jersey Application November 21, 1941, Serial No. 419,971

4 Claims. (Cl. 164—58)

This invention relates to cutting blocks and is herein illustrated as embodied in a cutting block adapted for use in connection with dies or hand knives for cutting blanks from sheet material, for example, shoe uppers from leather.

The principal requisites of material for blocks used in the cutting of blanks from sheet material are that it offer sufficient resistance to a cutting die or knife to render it possible to make a clean cut through the material operated upon in forming a blank, that it be sufficiently yielding, so that the edge of the cutting tool is not dulled rapidly and, at the same time, that it be highly resistant to wear. Wood, rubber, paper, and other substances have been commonly used, with varying degrees of success, as block materials. Attempts have also been made to use plastic materials in forming cutting blocks. However, considerable difficulty has been experienced in utilizing plastic materials for this purpose, because of the fact that if the plastic used is of sufficient hardness to resist penetration of a cutting tool, it is also found to be brittle to the extent that it chips out readily under the action of the cutting edge of the tool, with the result that the cutting surface of the block wears away rapidly. If, on the other hand, a comparatively soft plastic material is used, it has been found that dies or knives will readily penetrate it and stick, or that the cutting surface is not sufficiently resistant to penetration to make it possible to obtain a clean cut through the sheet material being operated upon.

In view of the foregoing, it is an object of the present invention to provide an improved cutting block, which will be especially adapted to facilitate accurate cutting operations, and which, at the same time, will be highly resistant to wear. To this end, and as illustrated, the invention consists in the provision of a cutting block formed of plastic material in which are embedded cellulosic fibers, such as sisal hemp fibers, extending substantially parallel to each other in directions normal to the cutting surface of the block. This construction is highly advantageous, in that the fibers adequately support the material to be operated upon, yet readily permit penetration of a cutting tool to the extent required to produce a clean cut. Preferably, a thermoplastic comparatively soft at room temperature is used, since the fibers tend to hold it together. Consequently, it has been found that the material does not chip out, with the result that the block has excellent wearing qualities. Furthermore, this material forms a cutting surface which is highly effective without the necessity of a breaking-in operation. In addition, the cutting surface can readily be repaired by passing a hot iron over the block surface, melting the thermoplastic material sufficiently to heal the cuts produced by the cutting tools.

These and other features of the invention are illustrated in the following specification and in the accompanying drawing, and are pointed out in the claims.

In the drawing,

Fig. 1 is a perspective view of a cutting block constructed in accordance with the invention;

Fig. 2 is a perspective view of one of the block sections forming the block; and Fig. 3 is a perspective view, partly in section, on an enlarged scale of a portion of the block.

As shown, the cutting block comprises a plurality of rectangular sections or plates 10, each of which is provided with a rib 12 extending along one end and one side thereof, and a recess 14 extending along the other side and end of the plate. The plates are assembled together in tiers, adjacent plates of each tier and of adjacent tiers being interlocked by placing the ribs 12 in adjoining recesses 14. The whole assembly is held together by a plurality of clamping irons 16 and 18 and bolts 20.

Each of the plates 10 is composed of a body portion, comprising cellulosic fibers 22, Fig. 2, which extend parallel to each other and at right angles to a flat upper face which forms a portion of the cutting surface 24 of the block. These fibers 22 are embedded in plastic material 26, which has been molded to the shape described.

A suitable molding composition consists essentially of from 55% to 65% by weight of raw sisal hemp fibers, and the balance of a binder preferably comprising a thermoplastic resin.

In producing the block sections, sisal fibers are placed in a mold in such a way that they all extend in the same direction, and thermoplastic material in powdered form is introduced into the mold, after which the molds are heated to about 275° F. and pressure is applied at about 1,000 pounds per square inch to produce the resultant block section. One material suitable for this purpose is a thermoplastic resin available under the name Thermelt, preferably having a melting point of about 175° F. and being soft enough at room temperature to be dented by the finger nail. The application of heat and pressure in the molds causes the plastic material to surround each of the sisal fibers and to coat it to a considerable extent. As a result of this, and the fact that the material is comparatively soft at room temperature, the block is to a large extent self-healing. That is, after a cutting edge has penetrated the block surface, then withdrawn, there is a tendency for the parts to spring back into position, and the coatings on the adjacent fibers will tend to stick them together, closing the cut. Because of the softness of the material, there is no tendency for the same to be chipped out during cutting operations performed upon the block surface, thus prolonging the life of the block. At the same time the fibers form an adequate work support which cooperates with cutting tools to produce a clean cut through the material operated upon.

Having described my invention, what I claim as new and desire to secure by Letters Patent of the United States is:

1. A cutting block comprising a body portion terminating in a flat cutting surface, said body portion being composed of plastic material having embedded therein sisal hemp fibers extending perpendicular to the cutting surface.

2. A cutting block comprising a body portion terminating in a flat cutting surface, the block being composed of sisal hemp fibers extending perpendicular to the cutting surface and embedded in a matrix of thermoplastic material.

3. A cutting block formed of thermoplastic material having embedded therein sisal hemp fibers extending normal to the cutting surface of the block.

4. A molded cutting block formed of sisal hemp fibers arranged in substantially parallel relation and bonded together by thermoplastic material which is comparatively soft at room temperature.

MIETH MAESER.